No. 668,237.  
E. WACKER & R. BOCK.  
DAMPER DEVICE FOR MECHANICAL MUSICAL INSTRUMENTS.  
(Application filed May 12, 1899.)

Patented Feb. 19, 1901.

(No Model.)

Witnesses:

Inventors.
Emil Wacker
& Richard Bock
by their Att'y.

UNITED STATES PATENT OFFICE.

EMIL WACKER AND RICHARD BOCK, OF LEIPSIC, GERMANY.

DAMPER DEVICE FOR MECHANICAL MUSICAL INSTRUMENTS.

SPECIFICATION forming part of Letters Patent No. 668,237, dated February 19, 1901.

Application filed May 12, 1899. Serial No. 716,569. (No model.)

*To all whom it may concern:*

Be it known that we, EMIL WACKER, a subject of the King of Prussia, German Emperor, and RICHARD BOCK, a subject of the Prince of Reuss, junior line, both residing at Leipsic, Saxony, Germany, have made new and useful Improvements in Damper Devices for Mechanical Musical Instruments, of which the following is a full and exact specification.

The present invention consists of a damper device for mechanical musical instruments, as hereinafter set forth, and particularly pointed out in the claim.

In order to render the present specification more easily intelligible, reference is had to the accompanying drawings, in which similar letters of reference denote similar parts throughout the several views.

Figure 1:
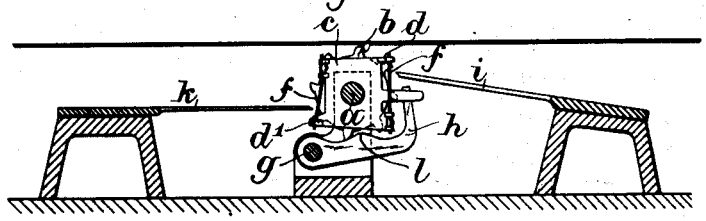
Figure 2:
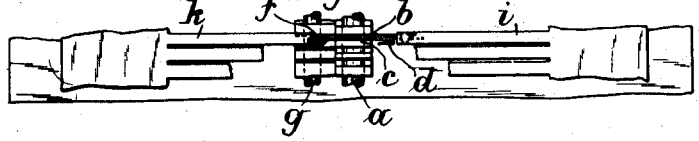
Figure 3:
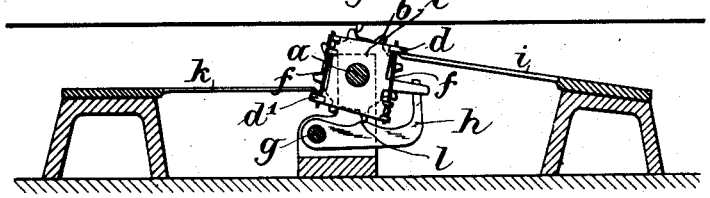
Figure 4:
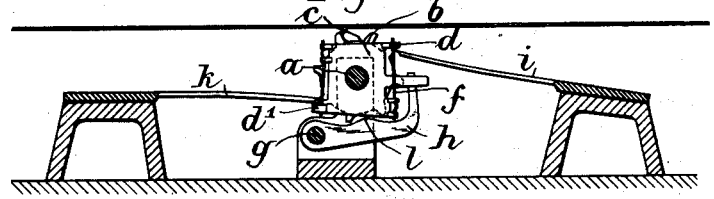
Figure 5A:
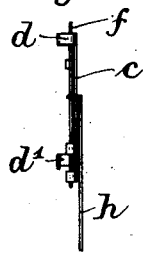
Figure 5:
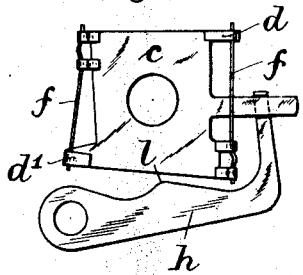
Figure 5B:
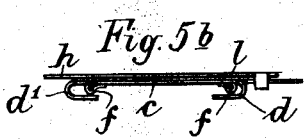

Figure 1 is a side elevation of the device out of operation; Fig. 2, a plan of Fig. 1; Fig. 3, a side elevation showing the damper in operation; Fig. 4, a similar elevation after the teeth of the comb have been struck; Fig. 5, a detail elevation of the damper, drawn on a larger scale; Fig. $5^a$, an end elevation, and Fig. $5^b$ a plan of Fig. 5.

The damper $c$ is mounted on the shaft $a$ of the striker-wheels $b$ with sufficient friction to enable it to remain in any position on the same into which it may be moved. At the upper and lower parts of each side of the damper are projections $d$ $d'$, adapted to contact with the teeth of the combs $i$ and $k$, respectively, and damp or deaden the vibration of the same after they have been struck to produce the note. Light springs $f f$ are clamped at the lower and upper end, respectively, of the damper at either side and extend loosely to within the space inclosed by the bent round projections $d$ $d'$. The object of these springs is to gradually contact with the end of the comb-tooth as the damper is operated, and thus to gently retard the vibration of the said tooth previous to the actual damping by the projections $d$ $d'$. This has the effect of gradually stopping the vibration and finally, when the damper contacts with the top or bottom surface of the tooth, of preventing the same from striking the damper several times before it is finally brought to rest, and thus a rattling of the comb-tooth end against the damper is prevented. Below the said damper a lever $h$ is pivoted and connected with the damper $c$, so as to move the same when the lever is moved. The said lever $h$ is provided with a projection $l$, against which the teeth of the striker-wheel $b$ may contact when the wheel is turned to strike the teeth of the comb with another of its teeth.

The device operates in the following manner: When the striker-wheel is turned to sound its particular tooth of the comb, another tooth of the striker-wheel contacts with the raised part $l$ of the lever $h$, depressing the latter and turning the damper $c$ into the position shown at Fig. 3, so that it will damp the particular tooth of the comb at either side by means of the springs $f f$ and projections $d'$ $d'$ immediately after the said tooth has been actuated. The vibration of the comb-teeth will, however, return the damper to its initial position, as indicated at Fig. 4, ready for the next operation by striking the projection $d$ or $d'$.

One damper is mounted alongside each striker-wheel, and each damper is adapted to operate on the two opposite teeth of the combs $i$ and $k$.

We claim as our invention—

In a mechanical musical instrument having two opposite combs and a series of striker-wheels, the combination of a damper arranged between the two combs and having upper and lower damper-springs and projections on opposite sides, a lever to operate said damper mounted in the path of movement of the teeth of the corresponding striker-wheel and adapted to be operated thereby, said damper having sufficient friction on its supporting-shaft to remain in the position into which it is moved by the said lever and the vibration of the teeth of the comb alternately.

In witness whereof we have hereunto set our hands in presence of two witnesses.

EMIL WACKER.
      RICHARD BOCK.

Witnesses:
 MORITZ SPREER,
 RUDOLPH FRICKE.